United States Patent
Nuti

(10) Patent No.: US 12,481,889 B1
(45) Date of Patent: Nov. 25, 2025

(54) STOCHASTICALLY ACTIVATED NEURAL NETWORK WITH TRAINING SYSTEM AND METHOD

(71) Applicant: SILVRETTA RESEARCH, INC., Larchmont, NY (US)

(72) Inventor: Giuseppe G. Nuti, Larchmont, NY (US)

(73) Assignee: SILVRETTA RESEARCH, INC., Larchmont, NY (US)

( * ) Notice: Subject to any disclaimer, the term of this patent is extended or adjusted under 35 U.S.C. 154(b) by 0 days.

(21) Appl. No.: 19/049,186

(22) Filed: Feb. 10, 2025

(51) Int. Cl.
- *G06N 3/08* (2023.01)
- *G06N 3/04* (2023.01)
- *G06N 3/047* (2023.01)
- *G06N 3/082* (2023.01)

(52) U.S. Cl.
CPC ............ *G06N 3/082* (2013.01); *G06N 3/047* (2023.01)

(58) Field of Classification Search
CPC ...... G06N 3/047; G06N 3/0475; G06N 30/04; G06N 3/0464; G06N 3/0495; G06N 3/0499; G06N 3/082
See application file for complete search history.

(56) References Cited

U.S. PATENT DOCUMENTS

| | | | |
|---|---|---|---|
| 11,823,027 B1 * | 11/2023 | Nuti | G06N 3/063 |
| 2022/0335296 A1 * | 10/2022 | Baker | G06N 3/084 |
| 2023/0316039 A1 * | 10/2023 | Shafipour | G06N 3/04 706/27 |

OTHER PUBLICATIONS

Scardapane et al., "Conditional Computation in Neural Networks: Principles and Research Trends", Jul. 9, 2024, ArXiv.com, pp. 1-29 (Year: 2024).*
Liu et al., "Dynamic Deep Neural Networks: Optimizing Accuracy-Efficiency Trade-offs by Selective Execution", Mar. 5, 2018, arXiv.com, pp. 1-12. (Year: 2018).*
Gallicchio et al., "Ray-Tracing for Conditionally Activated Neural Networks", Feb. 20, 2025, arXiv.com, pp. 1-6 (Year: 2025).*
Williams, R. J., "Simple Statistical Gradient-Following Algorithms for Connectionist Reinforcement Learning," Machine Learning, vol. 8, pp. 229-256, 1992.
Bengio et al., "Conditional Computation in Neural Networks for Faster Models," Conference paper at ICLR 2016, https://arxiv.org/abs/1511.06297, Jan. 7, 2016.
Han et al., "Dynamic Neural Networks: A Survey," https://arxiv.org/abs/2102.04906, Dec. 2, 2021.

(Continued)

*Primary Examiner* — Paulinho E Smith
(74) *Attorney, Agent, or Firm* — Williams Mullen; Thomas F. Bergert

(57) ABSTRACT

Embodiments of the present disclosure provide a stochastic neural network with training where the inputs to the gating function are not dependent on the control values of the previous layers' learnable weights but rather from a set of control-information weights, which may be fixed or adjustable. In various embodiments, a control node contains one or more control-parameters which control a set of activations and one or more information-parameters for the control node's output, to be consumed as inputs to the subsequent layers of control nodes. In various embodiments, one or more control-parameters and one or more information-parameters may be shared.

20 Claims, 5 Drawing Sheets

(56) References Cited

OTHER PUBLICATIONS

Scardapane et al., "Conditional computation in neural networks: principals and research trends," Intelligenza Artificiale, vol. 18, pp. 1-16, Jul. 9, 2024.
Liu et al., "A Survey on Inference Optimization Techniques for Mixture of Experts Models," Manuscript submitted to ACM, https://arxiv.org/abs/2412.14219, pp. 1-27, Dec. 18, 2024.
Huang, "Dynamic neural networks: advantages and challenges," National Science Review, vol. 11, Mar. 7, 2024.

* cited by examiner

STOCHASTICALLY ACTIVATED NEURAL NETWORK WITH TRAINING SYSTEM AND METHOD

TECHNICAL FIELD

The present disclosure relates to machine learning, and more particularly to a stochastically activated neural network with a training system and method.

BACKGROUND AND SUMMARY

Selective computation of Neural Networks (NNs) has been an active field of research for numerous decades, including a machine learning approach involving multiple specialized models or experts working together called Mixture of Experts ("MoE"). The core principle of MoE is to distribute the model's capacity across multiple specialized sub-networks, or experts, with a learned gating mechanism that selectively activates only the relevant experts for each input. This approach allows models to maintain a large parameter count while keeping computational costs manageable through sparse activation.

One of the main challenges in this area is the inability to accurately and efficiently train a stochastically activated network. Central issues are activation saturation and partial observability, i.e., the difficulty in creating an effective network that leverages the previous layers' activations as inputs alongside a training procedure for the components of the network that have not been activated. As an example of workarounds, the now ubiquitous MoE formulations in large models rely on training the entire network (removing the conditional activation), to then leverage a subset of experts during inference (e.g. a top-k experts approach).

The standard formulation for conditional activation of NNs has two (possibly intertwined) networks: a standard network for the output (terminating, for example, with a softmax node) and a control network to determine which blocks or nodes ought to be activated. In the control network, a layer leverages the previous layers' activation values (and any skip connections) as the inputs into the gating and/or activation function. This creates a conflict of objectives within the control network. On the one hand, it is desirable for the control actions to be as clear as possible (i.e., close to saturation), while on the other hand it is desirable to maintain diversity in the node's output so that the subsequent layers may be able to effectively determine which nodes to activate. Conversely, if the control network is allowed to leverage the nodes responsible for the output value (the standard or main network), it will create a requirement to back-propagate the derivative of the networks' output and of the activation policy, where the need for a clear policy and an expressive nodal output (in terms of diversity) will create either degenerating nodes and/or instability.

Embodiments of the present disclosure provide an alternative approach, where the inputs to the gating function are not dependent on the control values of the previous layers' learnable weights but rather from a set of information weights, which may be fixed or adjustable—alongside control-weights which specifically focus on modulating the stochastic policy. In its simplest form, a control node contains both the control-weights (e.g., an affine transform and non-linear activation function of the previous control nodes' outputs) which control a set of activations and a distinct set of information-weights for the control node's output—to be consumed as inputs to the subsequent layers of control nodes. The output parameters are different from the control parameters—though some parameters may be shared—described herein as control-parameters and information-parameters, respectively. The control nodes connected to the input layer will consume the input values. If all of the information-parameters are fixed, the network can be trained via a policy gradient step that is directly applied to each node (containing a stochastic policy) without the need for back-propagation. In other words, for the case where all the nodes have a fixed set of information-parameters as per reservoir computing methods, for example, the entire network can be trained without back-propagation. However, unlike reservoir computing, where only the last layer is trained, according to various embodiments described herein, the stochastic control nodes selectively activate parts of the network. Training the control policy determines which fixed parameters' nodes are activated, thus allowing for the entire network to be trained.

DETAILED DESCRIPTION OF EMBODIMENTS

Figure 1:
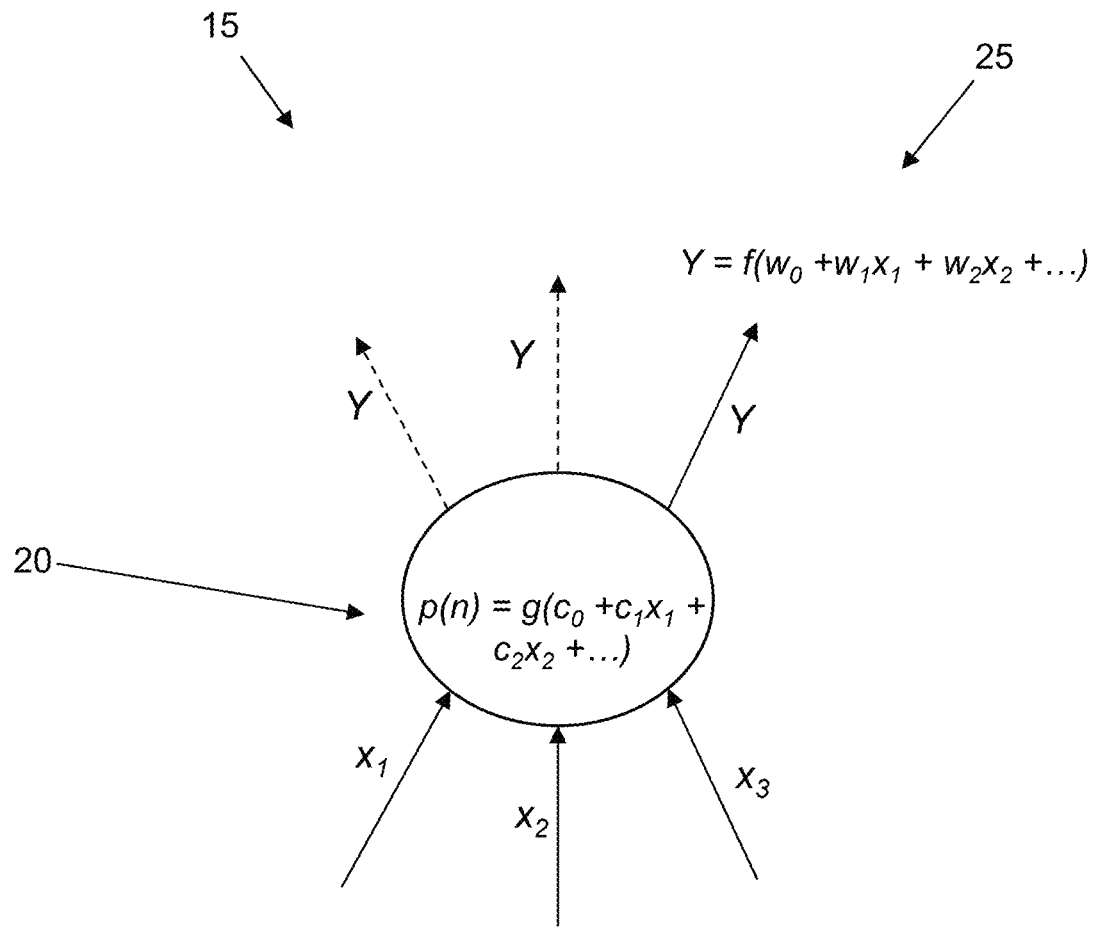
FIG. 1 is a diagram of a stochastic control node with trainable control-parameters and information-parameters according to embodiments of the present disclosure.

An exemplary stochastic control node 15 according to embodiments of the present disclosure is shown in FIG. 1. Such a node 15 controls conditional activation of at least part of a network, based on a function of its inputs. The node 15 includes trainable control-parameters $C_i$ and information-parameters $w_i$. Information-parameters are used for the output of the control node 15, whereas control-parameters are used for the activation policy of the control node 15. In the exemplary node 15 of FIG. 1, both the information-parameters, $w_i$, and the control-parameters, $C_i$, are shown as a linear transform of the node's inputs (the values $x_i$) with a nonlinear function $f(\cdot)$ for the control node's output and $g(\cdot)$ for its policy activation, resulting in a probability of activation of $p(n)$, as shown at 20. $p(n)$ determines the control probability which determines if this node 15 (and/or a different set of nodes) is to be activated.

As shown at 25 in FIG. 1, Y is the output that is passed through the network for nodes downstream to consume (including to possibly other control nodes).

According to various embodiments, some of the parameters may be shared, using, for example, a single control-parameter c as a wedge to directly modulate the saturation level of the control policy:

$$p(n)=g(\max(1,c)(w_0+w_1 x_1+w_2 x_2+\ldots))$$

Also, in various embodiments, the control-parameters are trained via a control-trace, while the information-parameters can be trained using standard methods.

Theoretically, a conditionally activated neural network becomes a Markov Decision Process (MDP) where the set of activated nodes fully defines the state the network is in. As such, the expected output of the network is defined as the probability weighted loss of the currently activated nodes, $L(w|G(c,w))$, where $p(G(c,w))$ represents the probability of a specific graph $G(\cdot)$ being stochastically activated (out of a universe of all possible graphs G), i.e., the set of nodes activated in this sampled trajectory (with w the standard network's parameters and c the set of control-parameters):

$$E[L(w,G(c,w)]=\Sigma_{G\in G}L(w|G(c,w)p(G(c,w))$$

Taking the expectation of the derivative with respect to both weights and control parameters, as per the "REINFORCE" policy gradient algorithm—alongside the product rule—for each trajectory τ:

$$E[\nabla w,c\ L(w,G(c,w)]=>\Sigma_\tau(\nabla_w L(w|G(c,w))+L(w|G(c,w) \nabla c,w\ \ln(((c,w)))$$

The first term of the expected derivative, namely $\nabla_w L(w|G(c,w))$, is the standard neural network design and is generally trained via back-propagation. Computing the second term, $\nabla c,w\ \ln(((c,w))$, allows for training both the control-parameters and the weight-parameters such that the nodes' control behavior can reach saturation (thus providing a stable sub-network) and the output of the control node can be used by subsequent layers leveraging the power of composing information through multiple layers of a network (i.e. latent representation). If all information-parameters are fixed, the dependency on the main network's weights, w, is removed, making the training simple and efficient.

The process of training this stochastically activated neural network according to embodiments as described herein relies on storing a control trace which is updated at every stochastic draw (i.e., at each random draw to determine if the node/nodes is/are to be activated or not). In other words, for fixed information-parameters, the control trace does not need to be back-propagated. For example, if a standard sigmoid activation function, $o(c)$, is used to determine the probability that a set of nodes are to be blocked, the stochastic control nodes can be updated with the following policy gradient step (where s (c) represents the affine transform inside the sigmoid function):

$L(w|G(c,w))o(c)\nabla_{c,w}s(c,w)$ if the node is blocked $L(w|G(c,w))(1-o(c))\nabla_{c,w}s(c,w)$ if the node is activated Since all but the realized loss function, $L(w|(G(c,w))$, is known at the time of making the activation decision, the control trace can directly be accumulated during the forward pass (at each stochastic draw), making it particularly suitable for recurrent neural networks (RNNs). The simplicity of the update permits keeping track of the policy gradient trace during each forward pass, accumulating the trace over time and finally multiplying it by the reward (as-is or in advantage form) when the predictions are made. In this setting, a recurrent neural network can include a network that is sampled multiple times, with the calculations building over samples on top of previously activated nodes, i.e., with the control nodes allowing an increasing number of activations that build on the calculated values of previously activated nodes. Specifically, for a node that undergoes a number of realized policy choices, e.g., activate or inhibit, $\pi_1(c), \ldots, \pi_T(c)$, the control trace for all of the control variables, $\zeta_c$, is updated at each forward pass:

$$\zeta_c = \Sigma_{t\in T}\nabla_c \ln(\pi_t(c))$$

noting that the input to each $\pi_t(c)$ is known at the time of calculation (i.e. during the forward pass), saving only the multiplication with the realized loss value, L, to after the inference is made (and possible back-propagation to upstream layers that can be executed with the standard training). The control node's derivative update becomes $c \leftarrow c + \lambda\ L\ \zeta_c$ (using a learning rate λ). The update to the control values can now be done entirely in parallel, considerably speeding up the process: the backpropagation is executed only for the activated nodes while policy training, which is performed for all control nodes that have a policy action, can be performed entirely asynchronously.

The probability of activation (or inhibition) can be computed via a variety of different functions, for example, a sigmoid activation, a softmax function, a Laplace activation, and so forth.

From a theoretical standpoint, when the input values to the nodes that contain a stochastic policy are dependent on the set of activated nodes, each policy node defines a part of a transition matrix. If every node were to be stochastically activated, the full set of possible states has size $2^n$, where n represents the number of nodes in the network. While this may be a large number, the main challenge of having an unbiased estimate of derivative that is efficient to compute is addressed and that allows for a stable policy and an expressive output of the control nodes.

It will be appreciated that standard auxiliary penalties, geared towards promoting a balanced computational load or varied activation across the network, are applicable in the embodiments as disclosed herein. Additionally, the control network's weights can be modified to target the distributional properties of the inputs to the control nodes. In various embodiments, minimizing the temporal auto-covariance within each activation node and/or maximizing the variance of activations across a batch are the most effective auxiliary penalties to foster load balancing and diverse nodal activity.

Application of the Control Trace to a Variety of Policy Nodes

Figure 5:
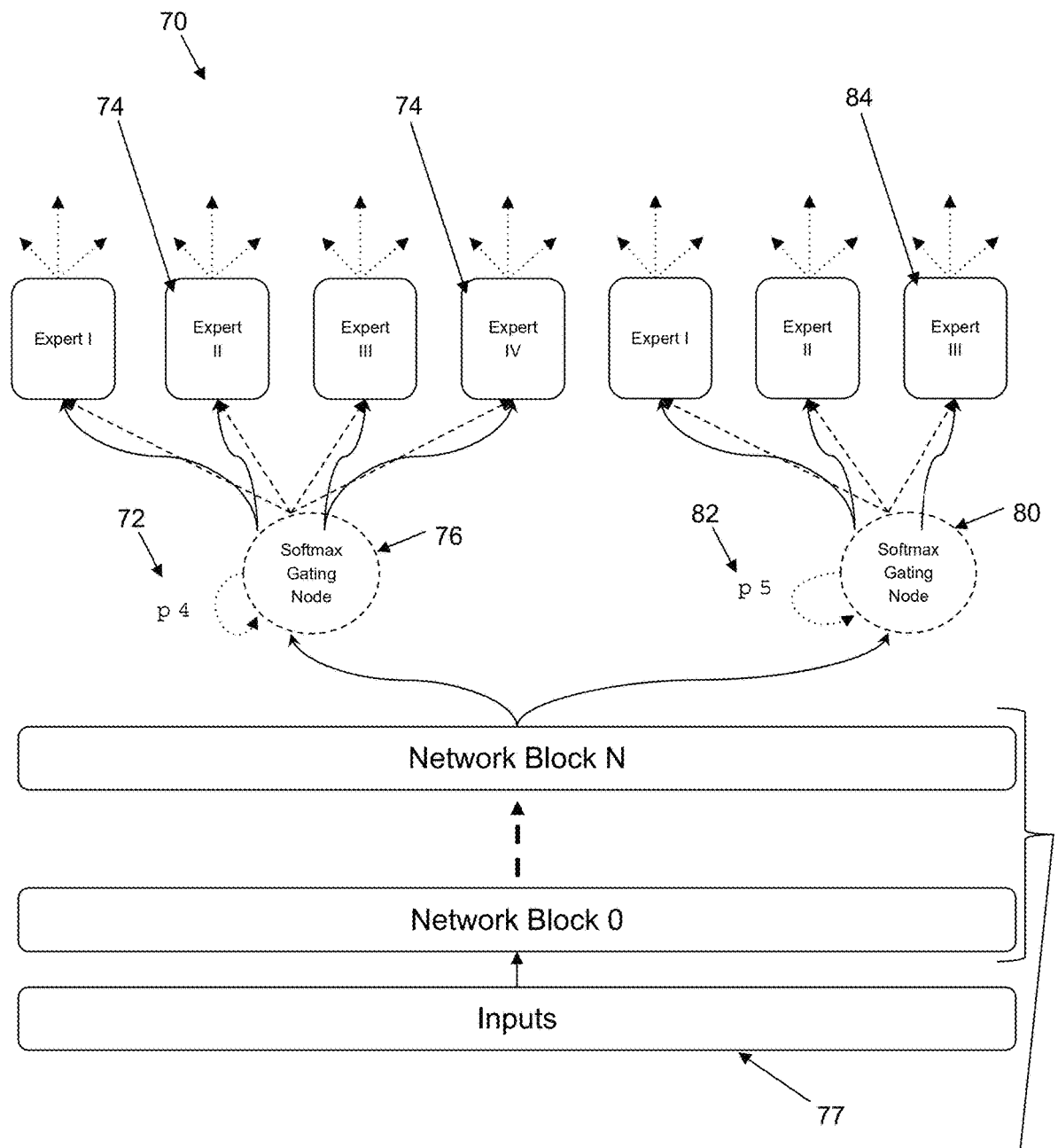
FIG. 5 is an exemplary diagram of a network with inputs and outputs to a mixture of experts via a softmax gating node according to embodiments of the present disclosure.

According to various embodiments, constructing control nodes with control-parameters and information-parameters, which are trained via a control trace, can be applied to a variety of different constructs that modulate the stochastic activation of the neural network. For example, inhibitor nodes can be scattered throughout the network. When an inhibitor node is activated, it blocks the computation of all of the nodes connected to it. Further, in various embodiments, each node throughout the network can be activated or blocked via a set of control weights. When the inhibitory signal for a node is fired, the node does not produce an output. Further, in various embodiments, inhibited reservoir computing is employed, whereby every node has fixed information-parameters throughout the network, and whereby inhibitor nodes, which can be ubiquitous or scattered throughout, modulate activation of the fixed-weight nodes via separate (learnable) control-parameters. According to various embodiments of the present disclosure, as illustrated in FIG. 5 and described elsewhere herein, for example, a stochastically trained mixture of experts is provided, whereby each softmax gated block of nodes is stochastically activated and where the inputs to the gating function are derived from information-parameters of a network connected to the input values.

Figure 2:
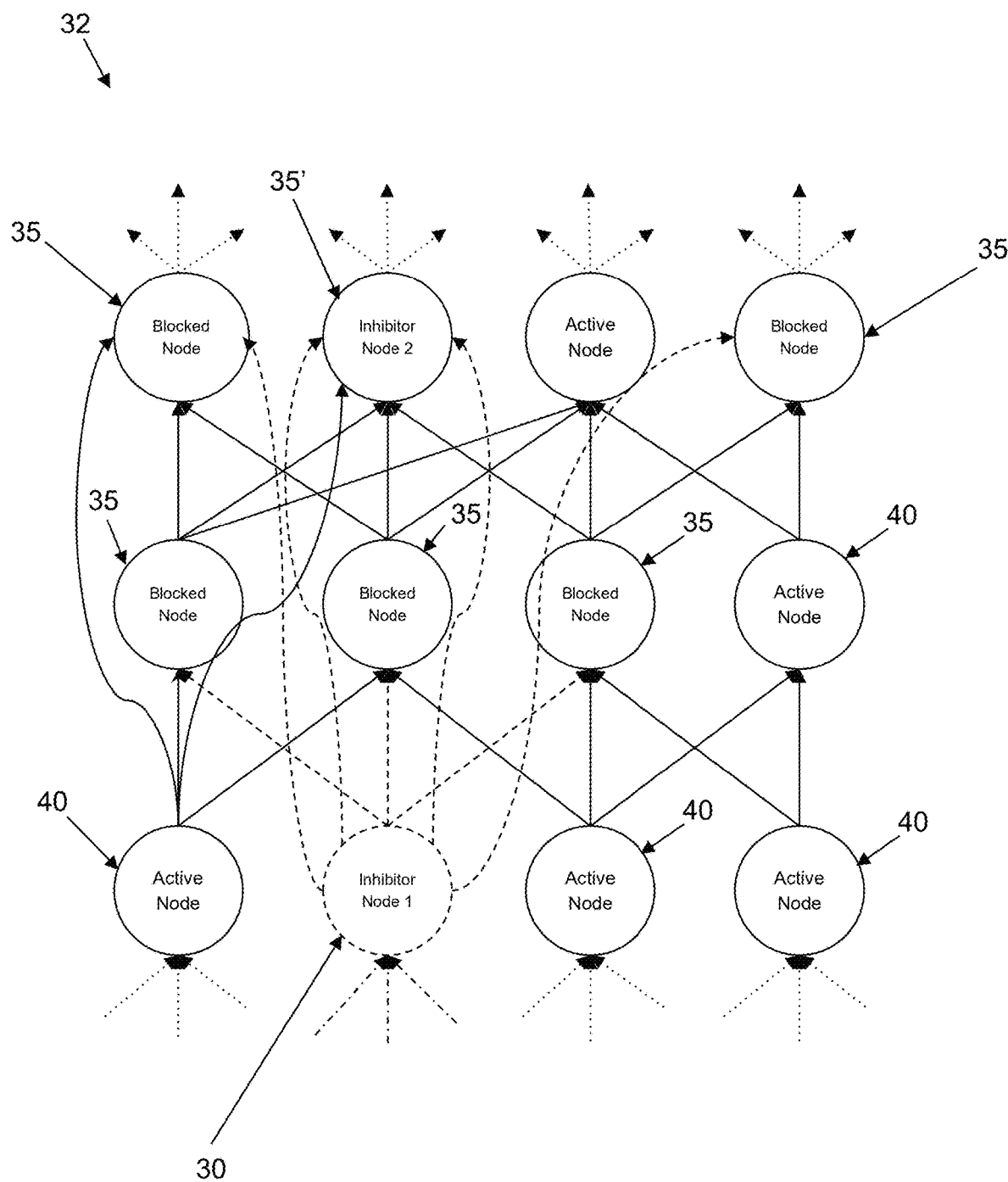
FIGS. 2 through 4 are exemplary diagrams of a network block for different input problems with one or more active nodes, blocked nodes and inhibitor nodes, and control action and/or information passed therebetween, according to embodiments of the present disclosure.

A particularly efficient approach is one where inhibitor nodes are scattered throughout the network. Once an inhibitor node is activated, all of the nodes it connects to will be blocked from calculating. For example, as shown in FIG. 2, an activated inhibitor node/inactive control node (indicated at 30) inhibits (i.e., blocks) the nodes it is connected to, as illustrated in dashed lines emanating from node 30. The blocked nodes from activated inhibitor node 30 are indicated at 35. The node indicated at 35' is a blocked node as well as a further inhibitor node. The output of the inhibitor node 30 can be computed using a distinct set of weights, the information-parameters, while the probability of activation of the inhibitor node is computed using a set of control-parameters, as described elsewhere herein. This allows for information to flow through the network (with a rich representation of the transformed inputs) alongside having a near-saturation control mechanism.

Figure 3:
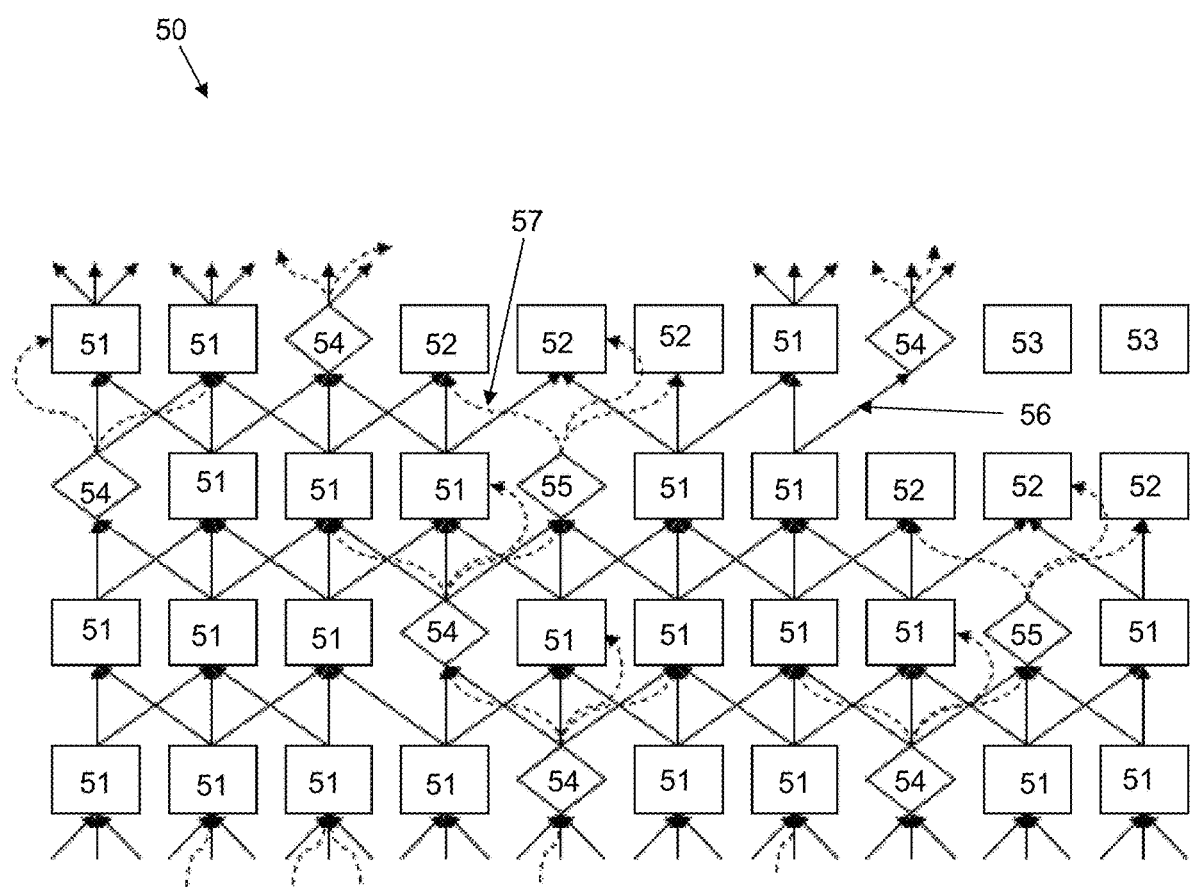
Figure 4:
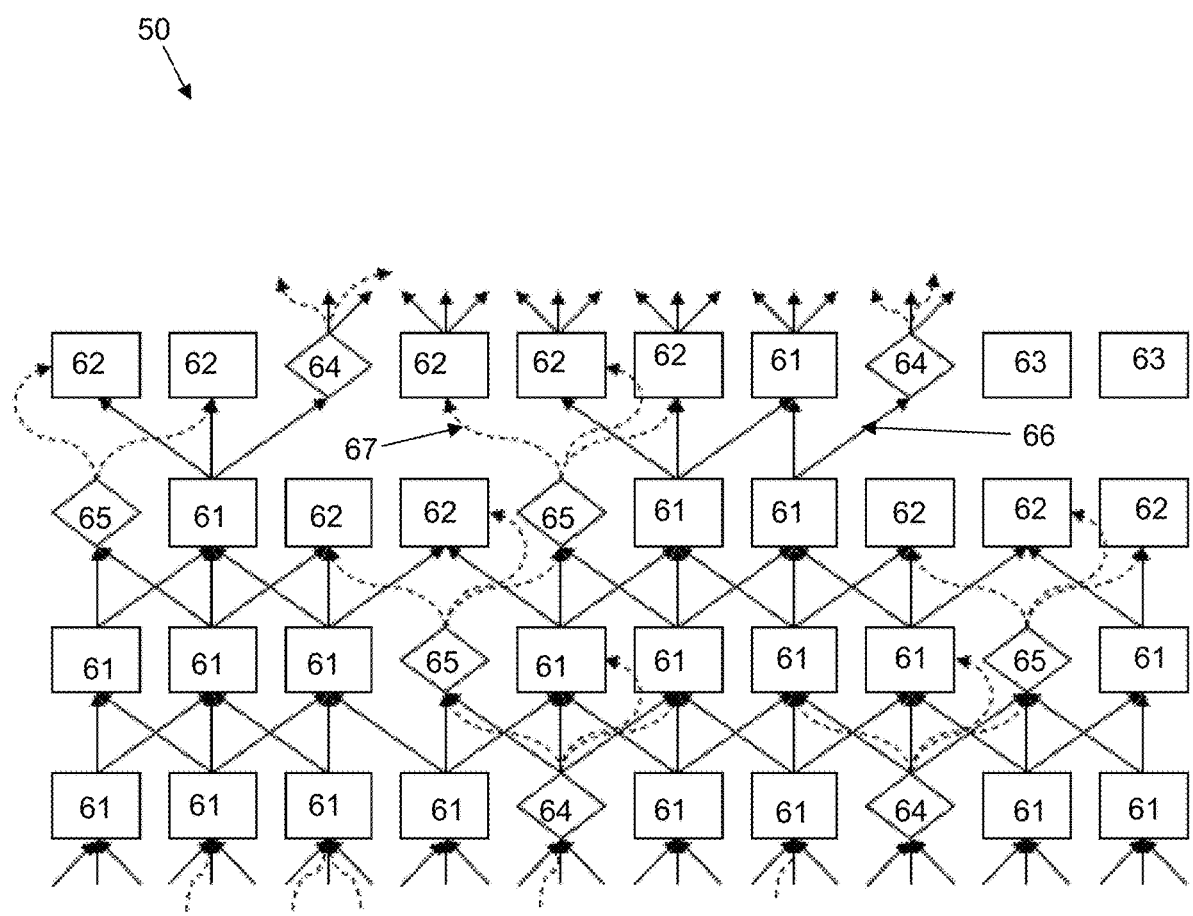

FIGS. 2 through 4 illustrate the operation of a network with control nodes (as described elsewhere herein) depicted in the same network over different inference problems and/or over the same inference problem at different sampling times. Each control node has an information-parameter and a control-parameter, and in various embodiments, at least one of the control nodes is a stochastic control node that stochastically controls conditional activation of at least a portion of the neural network. Inputs to a control node can be based on a fixed parametrization or the activation status of incoming nodes, according to various embodiments.

In FIG. 2, active standard nodes in network block 32 (e.g., a subnetwork of a larger neural network) are indicated at 40, an activated inhibitor node (i.e., inactive control node) is indicated at 30, blocked nodes are indicated at 35 and 35', with 35' also representing a second inactive control node.

In FIG. 3, standard (i.e., compute) nodes in network block 50 (e.g., a subnetwork of a larger neural network) are indicated at 51, blocked standard nodes with inputs are indicated at 52 and blocked standard nodes with no inputs are indicated at 53. Inactive control nodes (i.e., inhibitor nodes) are shown at 54 and active control nodes are shown at 55. Solid arrows indicate information lines as at 56 and dashed lines indicate a control action as at 57. Thus, in network block 50, there are only two active control nodes 55 and there are six inactive control nodes 54. It will be appreciated that blocked nodes 53 have no inputs and no outputs.

FIG. 4 shows the same network block 50 as in FIG. 3, except at a different sampling time and/or with a different inference problem. In FIG. 4, standard nodes are indicated at 61, blocked standard nodes with inputs are indicated at 62 and blocked standard nodes with no inputs are indicated at 63. Inactive control nodes (i.e., inhibitor nodes) are shown at 64 and active control nodes are shown at 65. Solid arrows indicate information lines as at 66 and dashed lines indicate a control action as at 67. Thus, in network block 50 of FIG. 4, there are four active control nodes 55 and four inactive control nodes 54. It will be appreciated that blocked nodes 53 have no inputs and no outputs.

It will be appreciated that, when more inhibitor nodes are activated for a given network or network block, a smaller set of compute nodes remain active.

In various embodiments, such as for a MoE construct, for example, the network can be stochastically trained by using the control trace. The standard top-k formulation requires training the entire set of experts (using backpropagation), which is both time consuming and lacks the proportional use of experts depending on the difficulty of the problem. In contrast, a stochastically activated & trained MoE network with separate information-parameters is constructed as described herein with (1) a transform of the inputs using a fixed parametrization (e.g., the Information Control Network); (2) a user-defined number of independent draws, m, indicating a desired number of policy actions to be taken for each query; (3) possible use of an auxiliary load-balancing penalty; and/or (4) possible use of an auxiliary normalization of the Information Control Network so as to target specific distributional properties of the transform, such as a target mean and variance, which may be dependent on which expert is activated, for example.

The user-defined independent draws count, m, permits a dynamic adjustment of the number of experts used based on the softmax probabilities, for example. To illustrate this point, a gate which, for a specific instance, has most of the probability mass pointing towards a single expert, will likely have all m draws directed to the same expert (and thus will activate only one expert). Conversely, an input query that configures the gate in a set of similar (mutually exclusive) routing probabilities will distribute the m draws to multiple experts. This construct achieves key objectives by dynamically assigning MoE resources based on the difficulty of the problem, training only the activated expert(s), thus saving computational resources, removing the need to multiply expert probability with expert output, which speeds up the calculations and provides for a more stable network, and allowing for a very large number of experts as only the experts that are activated need to be trained.

FIG. 5 is exemplary with regard to a MoE construct 70. As shown therein, the stochastic activation policy consists in drawing m1 independent routing choices as at 72, resulting in one or more experts being activated, e.g., experts II and IV identified at 74. The soft-max node (i.e., the control node) 76 outputs both the control, i.e. which expert(s) to activate (indicated in dashed arrows exiting node 76), and the transformed data (indicated in solid arrows exiting node 76) by leveraging its control-parameters and its information parameters, respectively, as described elsewhere herein. Inputs 77 from an inference problem can be processed through one or more network blocks $N_0$-$N_N$ illustrated at 78, leading to the softmax gating nodes 76, 80. As with m1, the stochastic activation policy can further include drawing m2 independent routing choices as at 82, resulting in one or more experts being activated, e.g., expert III identified at 84.

Embodiments of the present disclosure thus provide a stochastically activated neural network having connected nodes, with each node being connected to at least one other node. The network is arranged such that a first subset of the nodes is one or more control nodes, wherein each control node has an information-parameter and a control-parameter. The information-parameter has a weight to compute input to at least one subsequent node in the network. Also, at least one of the control nodes is a stochastic control node that stochastically controls conditional activation of a portion of the neural network based on a function of one or more inputs to the one or more control nodes and of the control-parameter.

In various embodiments, the information-parameter is fixed. However, the information-parameter can also be adjustable according to various embodiments. The control-parameter can be trainable via a control trace per embodiments as described herein. For example, the control trace is updated at each forward pass of the neural network to train the nodes to be subsequently activated. It will be appreciated that according to various embodiments disclosed herein, the control trace is not back-propagated. In various embodiments, the stochastic control node includes a probability of activation.

According to various embodiments disclosed herein, the network includes at least one inhibitor node, wherein activation of an inhibitor node blocks a calculation of nodes connected to and subsequent to the activated inhibitor node. It will be appreciated that the activated inhibitor node can be an inactive control node.

In addition to the control nodes, the network according to embodiments herein can include a second subset of nodes in the form of one or more standard information nodes. One or more of the standard information nodes can be blocked, for example. When blocked, the node has no inputs or outputs (as illustrated at 53 in FIGS. 3 and 4, for example).

It will be appreciated that each of the nodes in the network can be activated or blocked via the control-parameter of one or more control nodes. Further, as described elsewhere herein, the control-parameter and the information-parameter can be shared for one or more nodes.

Embodiments of the present disclosure further provide a method for training a stochastically activated neural network, where the method includes providing a stochastically activated neural network having multiple nodes, wherein each node is connected to at least one other node, wherein a first subset of the nodes is one or more control nodes, wherein each control node has an information-parameter and a control-parameter, wherein at least one of the control nodes is a stochastic control node that stochastically controls conditional activation of at least a portion of the neural network. The method can further include training the control-parameter of each of the control nodes via a control trace and updating the control trace at each forward pass of the neural network to train which of the nodes will be subsequently activated. It will be appreciated that each node can have either an activated status or an inactivated status.

In various embodiments, the stochastic control node uses as inputs a set of indicator values representing the state of incoming nodes to the stochastic control node as activated or inhibited. In various embodiments, the stochastic control node uses as inputs a set of values that are determined via fixed parameters of the incoming nodes to the stochastic control node. It will be appreciated that in some embodiments, the stochastic control node uses as inputs a set of values that are determined via parameters of the incoming nodes to the stochastic control node, wherein the control-parameter of the stochastic control node is adjusted to modulate distributional properties of the control node activations. According to various embodiments, the stochastic control node uses as inputs a set of control values and draws a number of outcomes based on a plurality of outcomes to dynamically assign computational resources for the network.

As described, the present disclosure contemplates a variety of different network arrangements, systems and methods each having one or more of a plurality of different features, attributes, or characteristics. A "system" as used herein can refer, for example, to various configurations of one or more computing networks, processing elements or computing devices, such as desktop computers, laptop computers, tablet computers, personal digital assistants, mobile phones, and other mobile computing devices. In certain embodiments in which the system includes a computing device, the computing device is any suitable computing device (such as a server) that includes at least one processor and at least one memory device or data storage device. As further described herein, the computing device includes at least one processor configured to transmit and receive data or signals representing events, messages, commands, or any other suitable information. The processor of the computing device is configured to execute the events, messages, or commands represented by such data or signals in conjunction with the operation of the computing device. As described elsewhere herein, embodiments of the disclosure can be developed on specialized hardware where nodes and synapses contain the calculation capabilities.

It will be appreciated that any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing, including a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RE, etc., or any suitable combination of the foregoing.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "network," "component," or "system." Furthermore, aspects of the present disclosure may take the form of a computer program product embodied in one or more computer readable media having computer readable program code embodied thereon.

It will be appreciated that all of the disclosed methods and procedures herein can be implemented using one or more computer programs, processing elements or components. These programs, processing elements and/or components may be provided as a series of computer instructions on any conventional computer-readable medium, including RAM, SATA DOM, or other storage media. The instructions may be configured to be executed by one or more processors which, when executing the series of computer instructions, performs or facilitates the performance of all or part of the disclosed methods and procedures.

Unless otherwise stated, devices, elements or components of the present disclosure that are in communication with each other do not need to be in continuous communication with each other. Further, devices, elements or components in communication with other devices or components can communicate directly or indirectly through one or more intermediate devices, elements or components or other intermediaries. Further, descriptions of embodiments of the present disclosure herein wherein several devices, elements and/or components are described as being in communication with one another does not imply that all such devices, elements or components are required, or that each of the disclosed devices, elements or components must communicate with every other device, element or component. In addition, while algorithms, process steps and/or method steps may be described in a sequential order, such approaches can be configured to work in different orders. In other words, any ordering of steps described herein does not, standing alone, dictate that the steps be performed in that order. The steps associated with methods and/or processes as described herein can be performed in any order practical. Additionally, some steps can be performed simultaneously or substantially simultaneously despite being described or implied as occurring non-simultaneously.

It will be appreciated that algorithms, method steps and process steps described herein can be implemented by appropriately programmed computers, processing elements and/or computing devices, for example. In this regard, a processor (e.g., a microprocessor or controller device) receives instructions from a memory or like storage device that contains and/or stores the instructions, and the processor executes those instructions, thereby performing a process defined by those instructions. Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#VB.NET, Python or the like, conventional procedural programming languages, such as the "C" programming language, Visual Basic, Fortran 2003, Perl COBOL 2002, PHP, ABAP, dynamic programming languages such as Python, Ruby and Groovy, or other programming languages. The program code may execute entirely on a user's computer, partly on a user's computer, as a stand-alone software package, partly on a user's computer and partly on a remote computer or entirely on the remote computer or server.

Where databases are described in the present disclosure, it will be appreciated that alternative database structures to those described, as well as other memory structures besides databases may be readily employed. The drawing figure representations and accompanying descriptions of any exemplary databases presented herein are illustrative and not restrictive arrangements for stored representations of data. Further, any exemplary entries of tables and parameter data represent example information only, and, despite any depiction of the databases as tables, other formats (including relational databases, object-based models and/or distributed databases) can be used to store, process and otherwise manipulate the data types described herein. Electronic storage can be local or remote storage, as will be understood to those skilled in the art. Appropriate encryption and other security methodologies can also be employed by the system of the present disclosure, as will be understood to one of ordinary skill in the art.

Embodiments of the present disclosure may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A stochastically activated neural network, comprising:
at least one processor comprising a plurality of nodes, wherein each node of the plurality of nodes is connected to at least one other node of the plurality of nodes;
a first subset of the plurality of nodes comprising one or more control nodes, wherein each of the one or more control nodes comprises an information-parameter and a control-parameter, wherein the information-parameter comprises a weight to compute input to at least one subsequent node of the plurality of nodes in the network and wherein the control-parameter is trainable via a control trace; and
wherein at least one of the one or more control nodes comprises a stochastic control node that stochastically controls conditional activation of a portion of the neural network based on a function of one or more inputs to the at least one of the one or more control nodes and of the control-parameter.

2. The stochastically activated neural network of claim 1, wherein the information-parameter is fixed.

3. The stochastically activated neural network of claim 1, wherein the information-parameter is adjustable.

4. The stochastically activated neural network of claim 1, wherein the control trace is updated at each forward pass of the neural network to train which of the plurality of nodes will be subsequently activated.

5. The stochastically activated neural network of claim 1, wherein the control trace is not back-propagated.

6. The stochastically activated neural network of claim 1, wherein the stochastic control node comprises a probability of activation.

7. The stochastically activated neural network of claim 1, further comprising at least one inhibitor node, wherein activation of the at least one inhibitor node blocks a calculation of nodes connected to and subsequent to the at least one inhibitor node in the neural network.

8. The stochastically activated neural network of claim 1, wherein the at least one inhibitor node is an inactive control node.

9. The stochastically activated neural network of claim 1, further comprising a second subset of the plurality of nodes, wherein the second subset comprises one or more standard information nodes.

10. The stochastically activated neural network of claim 9, wherein at least one of the one or more standard information nodes is blocked.

11. The stochastically activated neural network of claim 10, wherein the at least one blocked node has no inputs or outputs.

12. The stochastically activated neural network of claim 1, wherein each of the plurality of nodes can be activated or blocked via the control-parameter of the one or more control nodes.

13. The stochastically activated neural network of claim 1, wherein at least one of the control-parameter and the information-parameter is shared.

14. A method for training a stochastically activated neural network, comprising:
providing a stochastically activated neural network comprising a plurality of nodes, wherein each node of the plurality of nodes is connected to at least one other node of the plurality of nodes, wherein a first subset of the plurality of nodes comprises one or more control nodes, wherein each of the one or more control nodes comprises an information-parameter and a control-parameter, wherein at least one of the one or more control nodes comprises a stochastic control node that stochastically controls conditional activation of a portion of the neural network;

training the control-parameter of each of the one or more control nodes via a control trace; and updating the control trace at each forward pass of the neural network to train which of the plurality of nodes will be subsequently activated.

15. The method of claim 14, wherein each of the plurality of nodes is one of: activated and inactivated.

16. The method of claim 14, wherein the stochastic control node uses as inputs a set of indicator values representing the state of incoming nodes to the stochastic control node as activated or inhibited.

17. The method of claim 14, wherein the stochastic control node uses as inputs a set of values that are determined via fixed-parameters of the incoming nodes to the stochastic control node.

18. The method of claim 14, wherein the stochastic control node uses as inputs a set of values that are determined via parameters of the incoming nodes to the stochastic control node, wherein the control-parameter of the stochastic control node is adjusted to modulate distributional properties of the control node activations.

19. The method of claim 14, wherein the stochastic control node uses as inputs a set of control values and draw a number of outcomes based on a plurality of mutually exclusive outcomes to dynamically assign computational resources for the network.

20. A stochastically activated neural network, comprising:

at least one processor comprising a plurality of nodes, wherein each node of the plurality of nodes is connected to at least one other node of the plurality of nodes;

a first subset of the plurality of nodes comprising one or more control nodes, wherein each of the one or more control nodes comprises an information-parameter and a control-parameter, wherein the information-parameter comprises a weight to compute input to at least one subsequent node of the plurality of nodes in the network;

wherein at least one of the one or more control nodes comprises a stochastic control node that stochastically controls conditional activation of a portion of the neural network based on a function of one or more inputs to the at least one of the one or more control nodes and of the control-parameter; and a second subset of the plurality of nodes, wherein the second subset comprises one or more standard information nodes, wherein at least one of the one or more standard information nodes is blocked and wherein the at least one blocked node has no inputs or outputs.

* * * * *